United States Patent
Ferrant et al.

(10) Patent No.: US 6,891,922 B2
(45) Date of Patent: May 10, 2005

(54) METHODS AND APPARATUS FOR THE CLASSIFICATION OF NODULES

(75) Inventors: Matthieu Ferrant, Saint Remy les Chevreuse (FR); Kelly Lynn Karau, New Berlin, WI (US); Saad Ahmed Sirohey, Pewaukee, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 80 days.

(21) Appl. No.: 10/307,229

(22) Filed: Nov. 30, 2002

(65) Prior Publication Data

US 2004/0105527 A1 Jun. 3, 2004

Related U.S. Application Data

(63) Continuation-in-part of application No. 10/302,135, filed on Nov. 22, 2002.

(51) Int. Cl.[7] .................................................. A61B 6/03
(52) U.S. Cl. ............................... 378/62; 378/8; 378/15; 378/901
(58) Field of Search ........................... 378/4, 8, 15, 62, 378/901; 352/128, 131

(56) References Cited

U.S. PATENT DOCUMENTS

| | | |
|---|---|---|
| 5,779,634 A | 7/1998 | Ema et al. |
| 5,790,690 A | 8/1998 | Doi et al. |
| 5,807,256 A | 9/1998 | Taguchi et al. |
| 6,011,862 A | 1/2000 | Doi et al. |
| 6,138,045 A | 10/2000 | Kupinski et al. |
| 6,141,437 A | 10/2000 | Xu et al. |
| 2002/0028008 A1 * | 3/2002 | Fan et al. ................... 382/131 |
| 2002/0094119 A1 | 7/2002 | Sahadevan |
| 2002/0141627 A1 | 10/2002 | Romsdahl et al. |
| 2002/0177551 A1 | 11/2002 | Terman |
| 2003/0026503 A1 | 2/2003 | Kallergi et al. |
| 2003/0053697 A1 | 3/2003 | Aylward et al. |
| 2003/0072479 A1 | 4/2003 | Totterman et al. |
| 2003/0095696 A1 * | 5/2003 | Reeves et al. .............. 382/131 |
| 2003/0215119 A1 * | 11/2003 | Uppaluri et al. ............ 382/128 |
| 2003/0215120 A1 * | 11/2003 | Uppaluri et al. ............ 382/128 |

* cited by examiner

Primary Examiner—David V Bruce
(74) Attorney, Agent, or Firm—Carl B. Horton, Esq.; Armstrong Teasdale LLP

(57) ABSTRACT

A method for detection and classification of nodules (N) in a tomographic image of an anatomical zone of a patient includes segmenting the image to identify therein a region of interest including at least one nodule, and classifying regions of the nodule as one of solid, part-solid, and non-solid.

27 Claims, 10 Drawing Sheets

METHODS AND APPARATUS FOR THE CLASSIFICATION OF NODULES

CROSS REFERENCE TO RELATED APPLICATIONS

This application is a Continuation-In-Part (CIP) of U.S. application Ser. No. 10/302,135 titled METHOD FOR THE DETECTION AND AUTOMATIC CHARACTERIZATION OF NODULES IN A TOMOGRAPHIC IMAGE AND A SYSTEM OF MEDICAL IMAGING BY TOMODENSIMETRY, filed Nov. 22, 2002, which claims the benefit of French Application No. 01 15187 filed Nov. 23, 2001.

BACKGROUND OF THE INVENTION

This invention relates generally to medical imaging and, more particularly, to methods and apparatus for the classification of nodules.

The present invention concerns a process of automatic detection and classification of nodules in a tomographic image of an anatomical zone of a patient, and also a tomodensimetric medical imaging system permitting such a detection method to be implemented.

An application of such a method of particular interest is in the field of medical imaging, and in particular in oncology, especially for the early detection of lung cancers by the early detection and classification of pulmonary nodules. The early detection of nodules has a direct influence on the rate of survival of patients to a term of five years. At the present time, the rate of survival to five years can reach or even exceed 80%, while for a late detection the rate of survival falls to about 10%.

It is generally accepted that the growth of cells of a malignant tumor is on the whole exponential. Thus a method of detecting cancers consists of monitoring the growth of a suspect lesion. A technique permitting the implementation of this method consists of determining and monitoring the size of pulmonary nodules.

Historically, this monitoring was performed using two-dimensional images and evaluating the size of the module by using a measuring system with two coordinates.

It can be understood that an improvement consists of examining the nodules by using a tomographic image of the lung, that is, a three-dimensional image. This method of medical imaging enables an organ to be examined using x-rays, plane by plane, while measuring by means of detectors, differences of density of x-ray absorption by the biological tissues. Data coming from these detectors are processed by a processor for reconstituting in three dimensions the image of the organ examined. Thus, tomographic imaging constitutes a tool providing valuable aid for the early detection of cancers.

BRIEF SUMMARY OF THE INVENTION

In one aspect, a method for detection and classification of nodules (N) in a tomographic image of an anatomical zone of a patient is provided. The method includes segmenting the image to identify therein a region of interest including at least one nodule, and classifying regions of the nodule as one of solid, part-solid, and non-solid.

In another aspect, a computer is configured to segment an image to identify therein a region of interest including at least one nodule, and classify regions of the nodule as one of solid, part-solid, and non-solid.

In yet another aspect, an imaging system in provided. The system includes at least one radiation source, at least one radiation detector, and a computer operationally coupled to the at least one radiation source and the at least one radiation detector. The computer is configured to segment an image to identify therein a region of interest including at least one nodule, and classify regions of the nodule as one of solid, part-solid, and non-solid.

In still another aspect, a computer readable medium encoded with a program is provided. The program is configured to instruct a computer to segment an image to identify therein a region of interest including at least one nodule, and classify regions of the nodule as one of solid, part-solid, and non-solid.

BRIEF DESCRIPTION OF THE DRAWINGS

FIG. 5 shows a distance field illustrating the step of transformation of Euclidean distance.

FIG. 6 shows a field of geodesic distance values obtained from the step of transformation of geodesic distance.

DETAILED DESCRIPTION OF THE INVENTION

Figure 1:
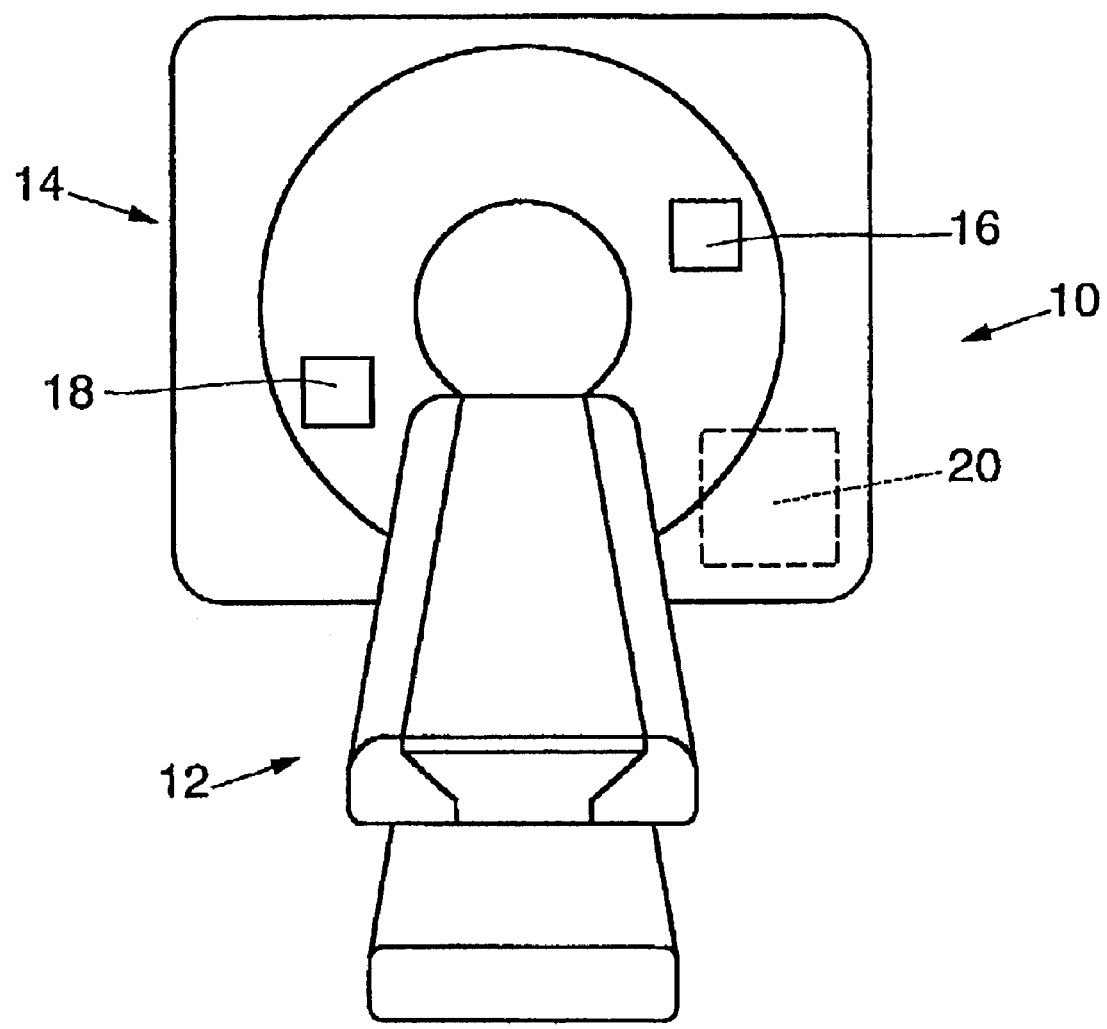
FIG. 1 is a schematic perspective view of a medical imaging system.

Herein are described methods and apparatus which provide for an automatic extraction of nodules in a tomographic image of an anatomical zone of a patient and a classification of portions of the nodule as solid, part-solid, and non-solid.

Thus, in accordance with one embodiment, such a method includes a segmentation of the image to identify a region of interest in the image, and a processing of the segmented image to identify the nodule and classify portions of the nodule as solid, part-solid, and non-solid.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Also as used herein, the phrase "reconstructing an image" is not intended to exclude embodiments of the present invention in which data representing an image is generated but a viewable image is not. However, many embodiments generate (or are configured to generate) at least one viewable image. Also as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

According to an exemplary embodiment, and in the course of the processing step, an ellipsoid inscribed in the region of interest is modeled, it is decided that the image elements inscribed in this ellipsoid correspond to a nodule and, for each zone of the region of interest extending outside the ellipsoid, the image elements are identified which do not belong to the nodule according to mathematical morphologic criteria.

According to one exemplary mode of implementation of this method, a Euclidean distance field is produced with respect to the perimeter of the segmented region of interest, the image elements locally having the greatest distance value are determined, and the center of the ellipsoid is positioned on an image element having the greatest distance value. The ellipsoid is constituted by a sphere having the above computed center and inscribed in the element of interest.

According to another feature of this method, a geodesic distance transformation is performed so as to create, starting from the center, geodesic surfaces respectively extending to increasing distances with respect to the center, each delimited by a set of image elements inscribed in the element of interest and equidistant from the center.

In an exemplary embodiment, and during the step of identification of image elements not belonging to the nodule, a separate processing is performed of each geodesic surface situated outside the sphere so as to determine whether the image elements which constitute it correspond at least partially to a nodule.

During the treatment of each geodesic surface, a discriminant analysis is performed starting from at least one morphologic criterion chosen from among the distance separating it from the center of the sphere, the connectivity of the image elements of a geodesic surface with the preceding ones, and the maximum Euclidean distance over this image element.

According to another feature of this method, the initial step of segmentation is implemented by morphologic segmentation, in particular by an extraction of water separation lines as used in known watershed algorithms.

In one embodiment, a preliminary filtering is performed, during which a volume is produced within which a portion of the image likely to include a nodule is inscribed, wherein the segmentation step is implemented on the image elements of the volume.

According to a feature of this embodiment, the step of filtering is implemented by a thresholding of numerical values associated with the image elements. As a variant, the step of thresholding is implemented by morphologic segmentation, in particular by the extraction of water separation lines.

To produce the volume, a histogram is, for example, produced of Boolean identification variables of the portion of the image likely to include a nodule, the Boolean variables being derived from the filtering (f) wherein the numerical values are respectively associated with image elements extending from the selected point along to a set of directions, the volume being produced starting from the Boolean variables.

According to yet another embodiment, preceding the step of segmentation, a step is furthermore performed of a detection of the wall of an organ of the anatomical zone examined, a mask is produced starting from the detected wall, and the mask is applied to the tomographic image.

During the step of detection of the wall of the organ, a volume is modeled, for example, having a contour applied against the internal wall of the organ within the organ, and the contour of the volume is then filtered for extracting from it the image elements not belonging to the wall.

In one embodiment, a computer program is configured to be loaded into the internal memory of a computer, and is characterized in that it includes a set of instruction codes adapted to the implementation of a method such as described herein.

Additionally, a tomodensimetric medical imaging system is likewise provided, including an x-ray emitter, corresponding detection means capable of measuring differences of the density of x-ray absorption by tissues of an anatomical zone examined, and a computer for processing the signals originating from the detection means, for producing an image of the anatomical zone, the computer including means for image segmentation for identifying a region of interest in the zone, and means for processing the segmented image for identifying nodules present therein.

According to an aspect of this system, the computer furthermore has means to model an ellipsoid inscribed in the region of interest, for deciding that the image elements inscribed in this ellipsoid correspond to a nodule, and means for analysis by mathematical morphology for identifying, in each zone of the region of interest extending outside the ellipsoid, image elements not belonging to the nodule.

A schematic perspective view is shown in FIG. 1 of a tomodensimetric medical imaging system according to the invention, denoted by the general reference numeral 10. In the applications considered, imaging system 10 facilitates the detection of pulmonary nodules allowing for the early detection of cancers.

As can be seen in FIG. 1, the imaging system 10 includes an examination table 12 on which a patient to be examined has been placed, and a tomodensimetric imaging system 14 conventionally emitting x-rays toward an anatomical zone of the patient, the detection of densities of x-ray absorption by the biological tissues examined, and the processing of these data by means of a computer for producing an image in three dimensions of an organ, in this instance a patient's lungs.

Imaging system 14 includes an x-ray emitter 16 supported by a turntable so as to be driven around the anatomical zone to be examined, and corresponding detection means 18, permitting the measurement of differences of density of x-ray absorption by the biological tissues examined, by recovering the x-rays coming from the emitter 16 and converting these x-rays into electronic signals.

A central unit 20, shown schematically, recovers the data coming from the detection means 18 in order to reconstruct an image in three dimensions of the organ or organs examined, from successive axial sections, typically 1–10 mm in thickness.

The central unit 20 is connected to a man/machine interface (not shown) permitting data entry on the one hand, and visualization of the images thus formed by means of a display device, on the other hand.

Furthermore, the central processing unit 20 includes at least one microprocessor connected to at least one memory into which all the software is loaded for the processing of the signals output from the detection means 18 for the formation of images from successive axial sections, and for the processing of the thus formed image for the detection of pulmonary nodules.

Figure 2:
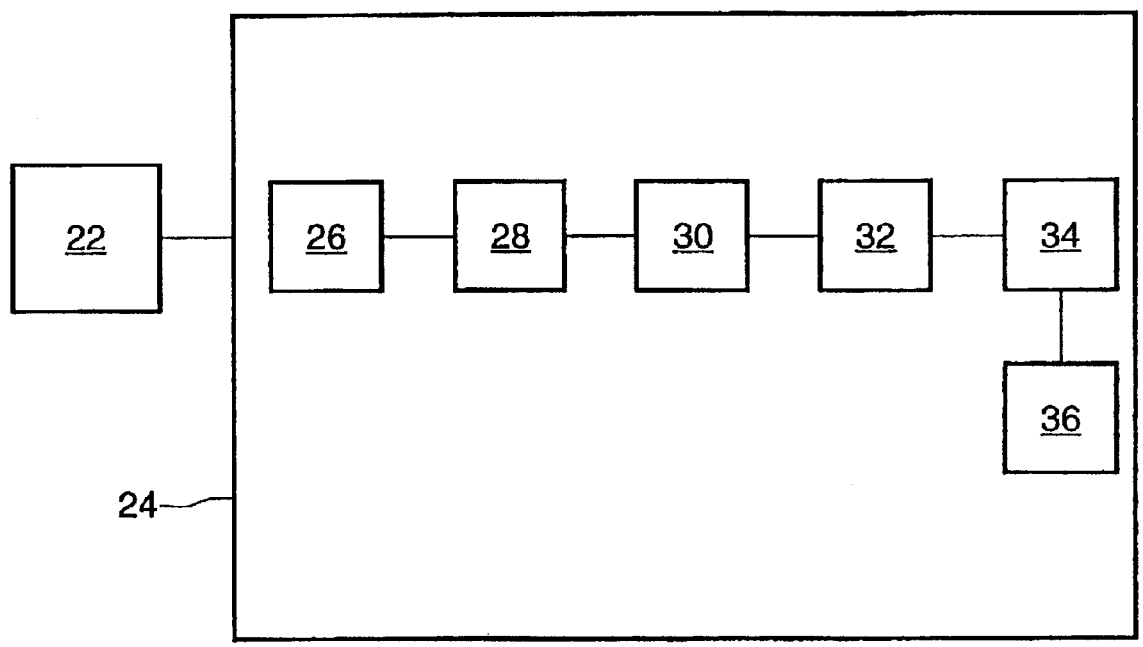
FIG. 2 illustrates the general structure of a processor of FIG. 1.

Referring to FIG. 2, these software means are constituted by a set of software modules performing, on the one hand, the reconstruction of the image, and on the other hand, the actual detection of the modules.

It can in fact be seen in FIG. 2 that the central unit 20 includes, stored in memory, a first software module 22 of conventional type performing a treatment of data output from the detection means 18 for forming a image in three dimensions of the organ or organs examined.

These software means are constituted by a set of instruction codes of conventional type. They will therefore not be described in detail hereinafter.

It will nevertheless be noted that, as previously mentioned, they permit the reconstruction of an image in three dimensions from successive axial sections, 1–10 mm in thickness, of the organ, as is known in the field of tomodensimetric medical imaging. Typically, this image is directly presented to an operator by means of the display device.

In such images, the pulmonary nodules are relatively difficult to identify and detect, particularly because of the large amount of data furnished by such images. Consequently, the central unit is furthermore provided with a software stage 24 performing an automatic detection of pulmonary nodules in the image presented to the operator.

As can be seen in FIG. 2, this software stage 24 includes a first module 26 effecting a preliminary filtering of the image, from a point selected by an operator, using a technique of preliminary segmentation, so as to produce a volume in which is inscribed a portion of the image likely to include a nodule.

Figure 3:
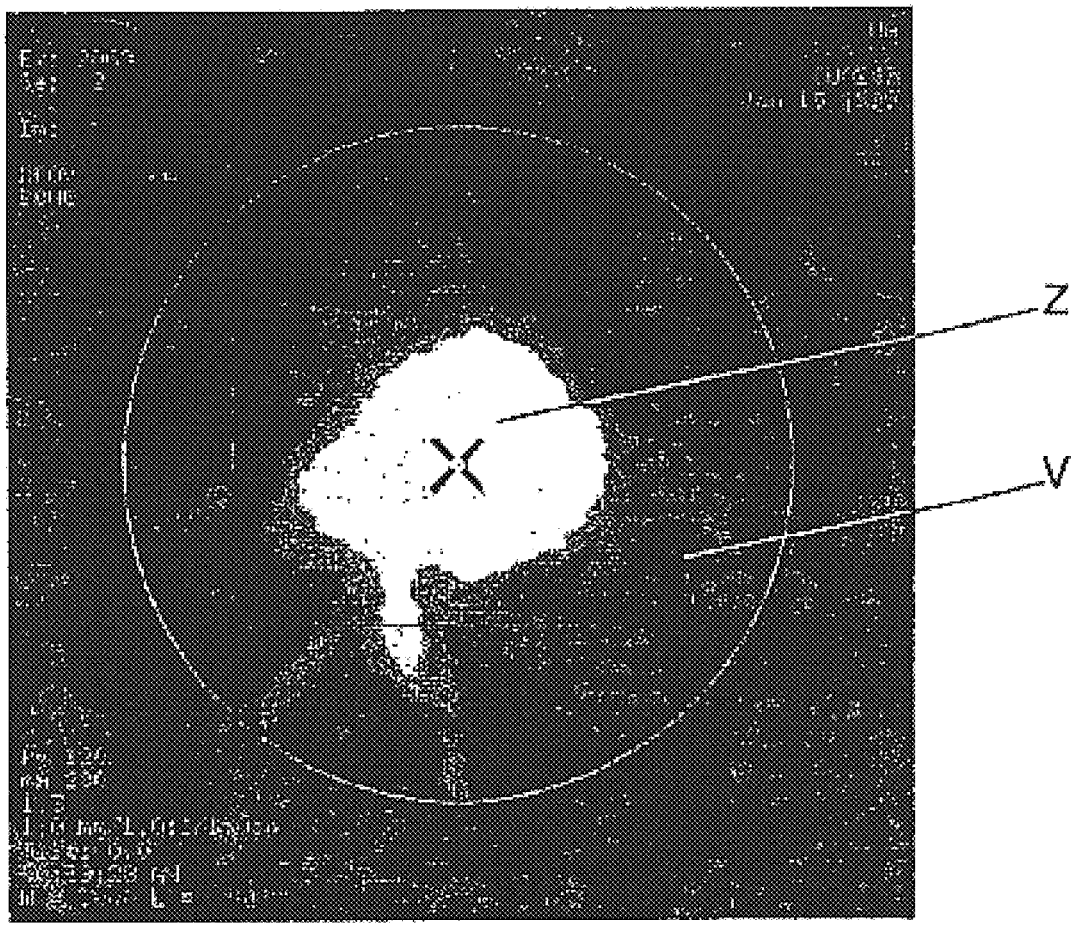
FIG. 3 is a radiographic image obtained by means of the system of FIG. 1, showing a selection of a suspect zone.

In one embodiment, and as can be seen in FIG. 3, this step of preliminary identification is effected based on a two-dimensional image, the operator selecting, by means of a cursor represented by a cross X, a point of a zone Z considered to be suspect, which suspect zone corresponds to a portion of the image likely to include a nodule.

As will be described in detail hereinafter, in response to such a selection, the central unit 20 produces a volume V in which is inscribed the whole of this image portion Z, and the processing of the image is essentially effected on this suspect volume. This is generally performed by manually entering the discriminant parameters permitting the extraction of the image of an object of interest.

These treatment means can be constituted by means for thresholding values of relative density associated with each image element. Thus, for example, a threshold is fixed equal to −332 HU (Hounsfield units).

Alternatively, a morphologic segmentation could likewise be used, for example, a technique termed "water separation line" (WSL, also referred to herein as a watershed algorithm), which will be described in detail hereinafter.

The filtering means are likewise connected to memory means permitting the production of a histogram in which are memorized, for the set of voxels extending in all directions from the selected point, the Boolean variables output from the filtering, by thresholding or by morphologic segmentation, which Boolean variables indicate whether or not the corresponding image element belongs to a portion of image likely to include a suspect object.

The first software module 26 is connected to a second software module 28 comprising the actual segmentation means for the digital image. The function of module 28 is to carry out appropriate image processing for identifying an element of interest in the image delivered by the upstream software stage or, in other words, to extract the background of the image.

This segmentation module, in one embodiment, includes means for morphologic segmentation. Advantageously, the extraction technique of water separation lines is used, which uses luminance gradient data for determining the contours in three dimensions which are described by a discontinuity of luminance in the volumetric data.

Such a technique is constituted by a technique of conventional mathematical morphology which is familiar to a person skilled in the art. It is described in the publication "Morphological Segmentation" by F. Meyer and S. Beucher, which appeared in the journal "Journal of Visual Communication and Image Representation", Volume 1, No. 1, September 1990, pages 21–46. It will therefore not be described in detail hereinafter.

However, for a better understanding of this mathematical morphology and, more particularly, this WSL technique, it may be advisable for the luminance function to be represented as a relief, the image points at levels of gray appearing brighter the higher they are. The same applies to the gradient of this luminance function.

In this relief, the crest lines of the gradient correspond to frontiers of regions to be segmented. An image can then be considered as a juxtaposition of basins, at the bottom of which a local minimum exists.

If a progressive flooding of the relief is performed starting from the local minima, each time the waters coming from two adjacent local minima meet, a dike can be constructed along the crest line corresponding to this line of meeting, such that the waters coming from the two distinct basins do not mix.

As will be described in detail hereinafter, and with reference to FIG. 4, the segmented image resulting from the processing effected by this second software module essentially appears in the form of a nodule and of a vascular tree V' associated therewith.

Again referring to FIG. 2, the software stage 24 furthermore includes a module 30 for distance transformation implementing a Euclidean distance field calculation for each voxel of the segmented image, with respect to the perimeter of the region of interest. This module essentially has the role of permitting the modeling of an ellipsoid, in this instance a sphere within the element of interest and, in particular, the largest sphere inscribed within the element of interest.

Figure 5:
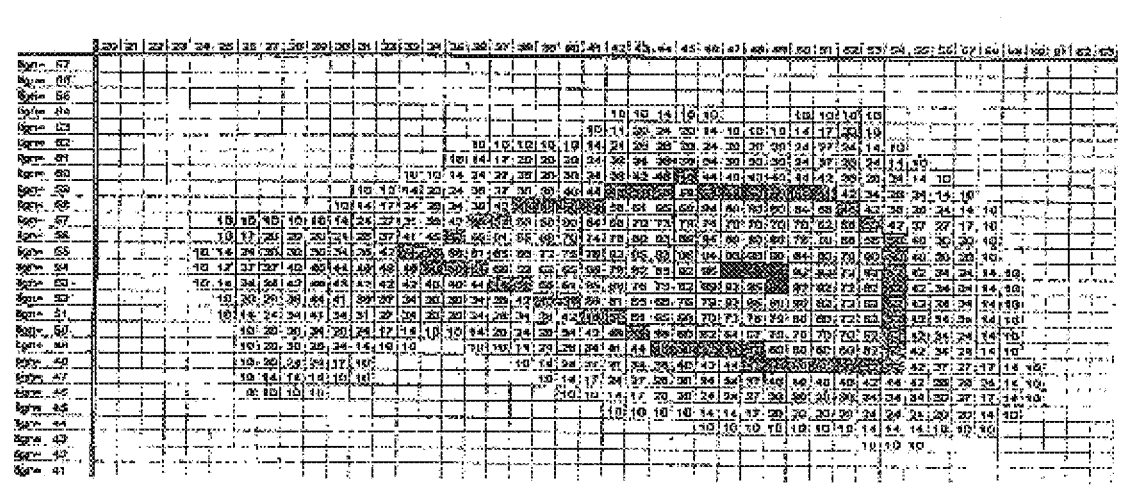

For each slice, there is obtained the distance field which can be seen in FIG. 5.

This third software module 30 is associated with a module 32 for geodesic distance transformation. This fourth module performs, as will be described hereinafter, the creation of geodesic surfaces respectively extending to increasing distances with respect to the center of the largest sphere inscribed within the element of interest and each delimited by a set of voxels inscribed within this element of interest and equidistant from the center.

At the output of the processing effected by this fourth software module 32, there is obtained, for each axial image slice, a field of geodesic distance values, for each voxel of the region of interest.

Finally, a fifth software module 34 undertakes a separate analysis of each geodesic surface situated outside the previously modeled sphere, so as to determine whether the voxels which constitute it correspond or not, at least partially, to a nodule.

It will be noted that the fifth software module is constituted by a discriminant analysis module performing, for example, the detection of a sudden variation of morphologic criteria, such as the distance separating each voxel from the center of the sphere, the connectivity of the voxels of a geodesic surface with the preceding ones, that is, the difference of relative density level between adjacent voxels, and the maximum Euclidean distance on the set of voxels of a given layer, to effect a discrimination between the nodule and the vessels associated with it.

In other words, this software module performs the extraction of the voxels corresponding to the vessels thus identified.

Figure 7:
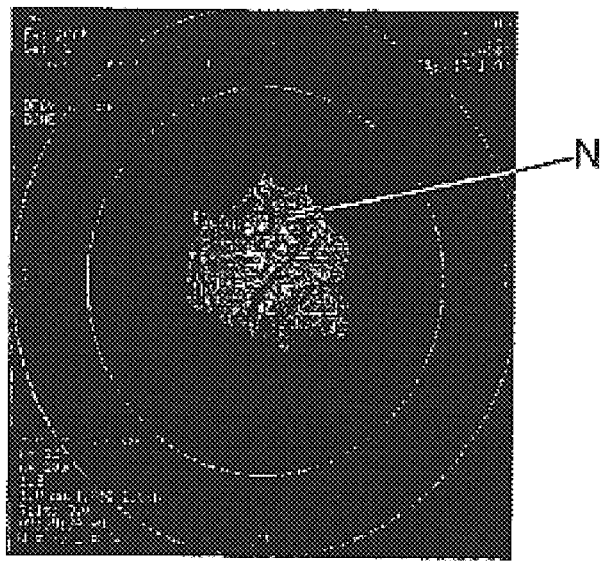
FIGS. 7 and 8 are images obtained by means of the imaging system of FIG. 1, at the output of the step of identification of image elements not belonging to the nodule, respectively showing an identified nodule and a vascular tree, extracted from the segmented image.
Figure 8:
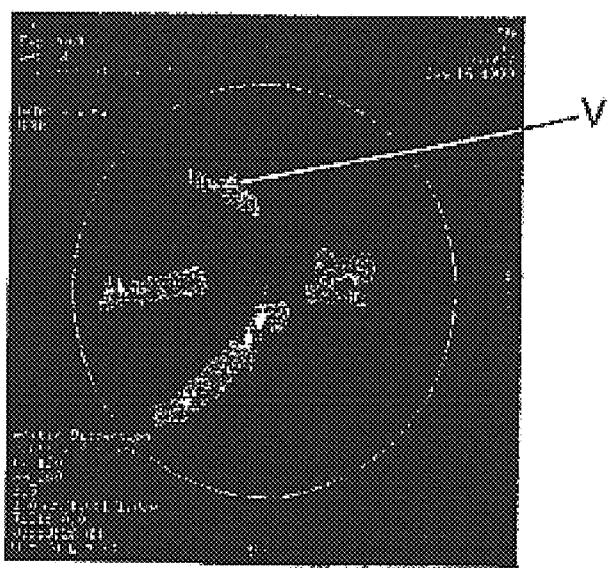

The images which can be seen in FIGS. 7 and 8 are then obtained, respectively corresponding to the nodules thus identified and to the vessels extracted from the image.

Finally, the software stage 24 incorporates a sixth software module 36 serving to determine the volume of the nodule according to conventional techniques, and to classify regions of the nodule as solid, part-solid, and non-solid.

Figure 9:
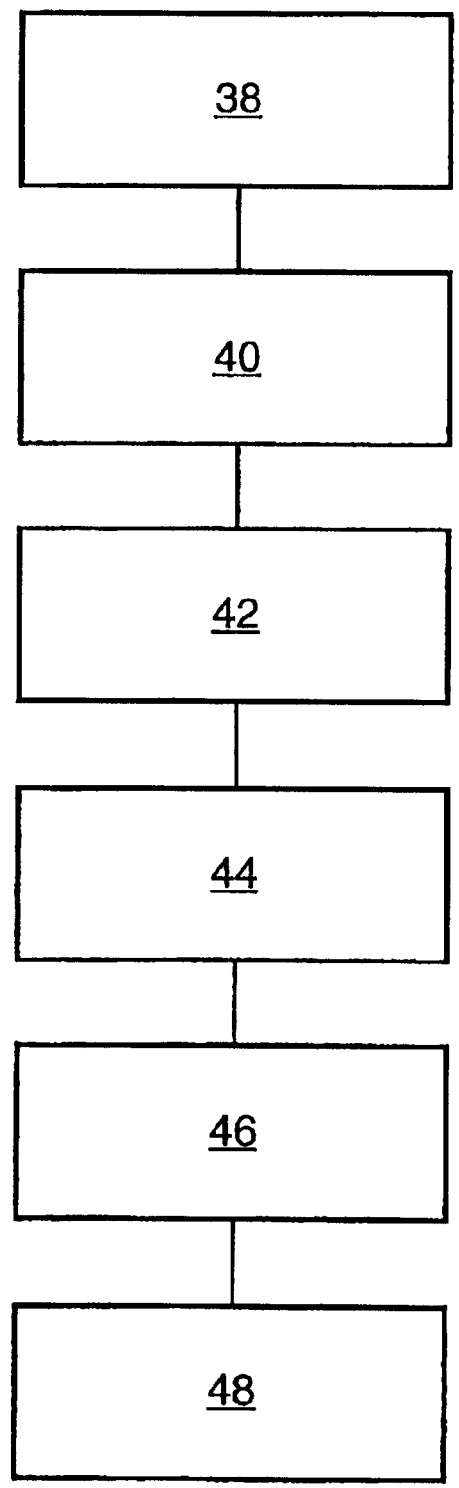
FIG. 9 illustrates the principal phases of a method of automatic detection of pulmonary nodules, implemented by means of the medical imaging system and processor of FIGS. 1 and 2.

The principal phases of the method of automatic detection of nodules in a tomographic image according to the invention, using the medical imaging system described hereinabove, will now be described with reference to FIG. 9.

In the course of a first phase 38 of this method, the user selects a suspect zone, that is, a zone of the tomographic image assessed by the operator to include a nodule.

During the following step 40, a preliminary segmentation of the image in three dimensions is performed so as to identify, as previously mentioned, the portions of the image likely to include a nodule, by producing a histogram which regroups, for each direction from a point selected by the operator, the voxels and the Boolean variables which are respectively associated therewith and which are obtained by filtering relative density values. From this histogram, a suspect volume V is then produced.

To perform the calculation of this histogram there is preferably used a filtering function with hysteresis, so as to avoid the appearance of errors of discontinuity or of segmentation. As can be seen in FIG. 3, at the output of this step 40 a volume V has been produced within which is inscribed a portion of the image, that is, a zone of the image which includes a nodule, some background, some vessels, and if necessary the wall of the lung.

During the following step 42, a segmentation, properly so called, of the image is performed for identifying therein a region of interest, that is, a discrimination is implemented between on the one hand, a nodule, vessels, and the lung wall, and on the other hand, the background.

As previously mentioned, the segmentation implemented during this step 42 is performed by morphologic separation, in particular, by extraction of water separation lines.

Figure 4:
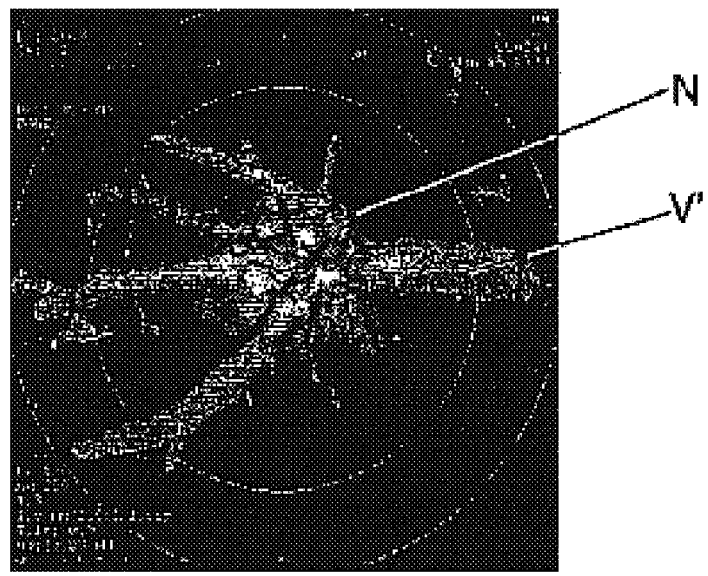
FIG. 4 illustrates an image obtained at the output of a step of segmentation by extraction of water separation lines.

There is then obtained the image which can be seen in FIG. 4 and which corresponds to an image in three dimensions of a nodule N and of the vessels associated with it.

During the following step 44, the computer 20 performs a modeling of an ellipsoid inscribed in the region of interest, so as to decide that the voxels inscribed in this latter will correspond to a nodule. To do this, and as previously described with reference to FIG. 5, an Euclidean distance field is produced with respect to the perimeter of the region of interest. A null numerical value is thus associated with the voxels situated on the perimeter of the region of interest, and a high numerical value with the voxels situated at the greatest distance from the perimeter.

It is then decided that the voxel having the greatest distance value constitutes the center of the ellipsoid. This ellipsoid is constituted by a sphere. In this case, the sphere is chosen as being the largest of the spheres having as center the point previously mentioned and being inscribed within the region of interest.

Figure 6:
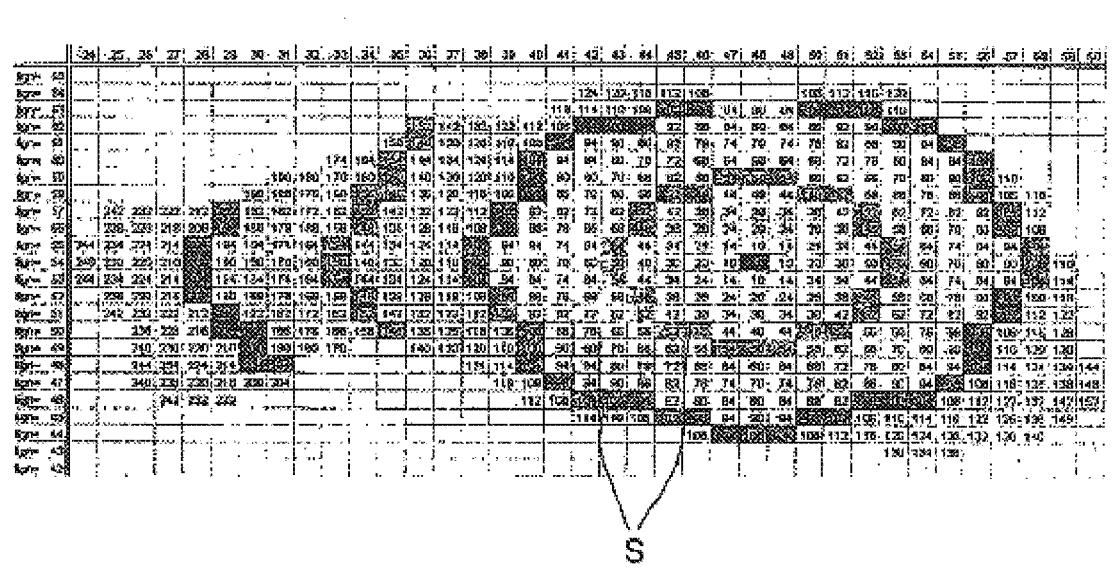

During the following step 46, the computer 20 proceeds to a phase of geodesic distance transformation, so as to create geodesic surfaces each inscribed within the element of interest and each constituted by a set of voxels equidistant from the center. As shown in FIG. 6, these geodesic surfaces are created from the center and extending to an increasing distance with respect thereto. They are formed by assigning to each voxel of each geodesic surface the same numerical value of geodesic distance.

It can be understood that the geodesic surfaces situated within the largest sphere inscribed in the element of interest are generally themselves constituted by spheres, the geodesic surfaces extending outside the latter being formed by substantially concave surfaces which can be partially or not included, or not, in a vessel or in a nodule. The computer then identifies the voxels inscribed in the largest sphere as corresponding to a nodule, and proceeds to a separate treatment of each geodesic surface situated outside the sphere, so as to determine whether or not the voxels which constitute it correspond to a nodule.

As mentioned previously, this step is essentially effected by detecting a sudden increase of morphologic criteria, such as the connectivity of the voxels and the distance separating them from the center of the sphere. During the following step 48, a display in three dimensions of the nodule thus identified, and a calculation of its volume, are then performed.

Finally, it will be noted that the methods and apparatus herein described permit a detection of pleural nodules, that is, nodules extending from the wall of a lung. In this case, for implementing the detection of such nodules, preceding the step of segmentation mentioned hereinabove, a detection of the wall of the lung is performed, a mask is produced from this detected wall, and the mask is applied to the tomographic image of the lung, so as to extract the lung wall therefrom.

Figure 10:
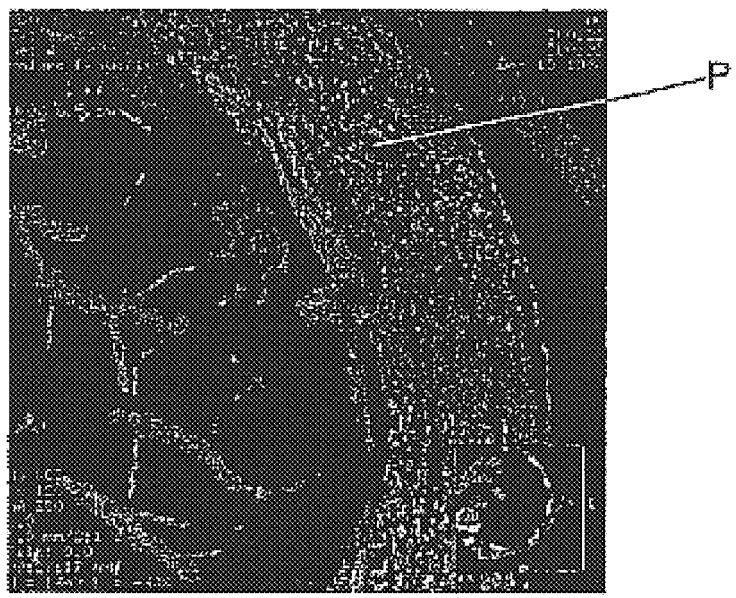
FIGS. 10 and 11 are radiographic images illustrating an embodiment permitting an identification of pleural nodules.
Figure 11:
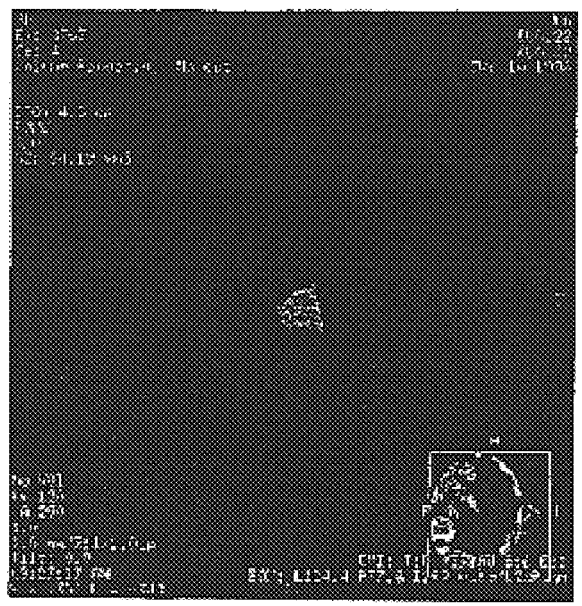

To do this, for example, a volume with a closed contour is caused to grow in the lung until the contour is applied against the wall P of the lung. The shape thus obtained is then simplified so as to omit the vessels from the nodules, using a morphologic tool. After the extraction of the wall of the lung, the nodule is then processed using the previously mentioned technology (FIGS. 10 and 11).

Figure 12:
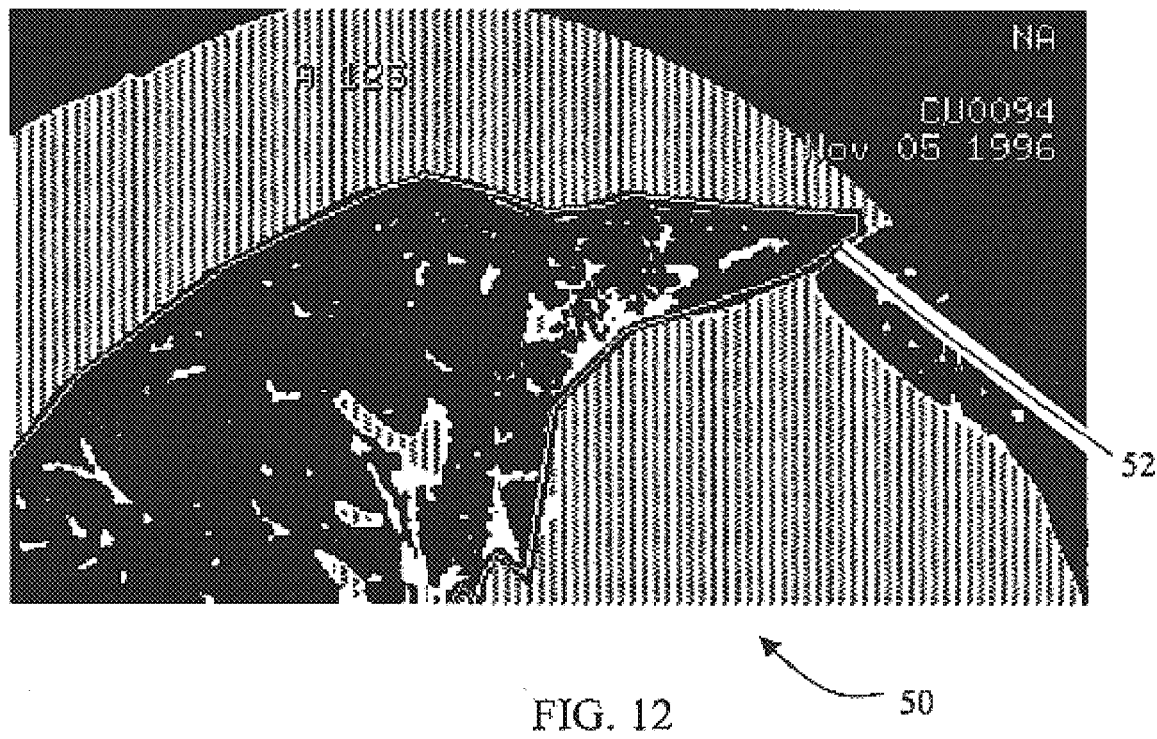
FIG. 12 illustrates two objects connected together by a thin tissue tendril.
Figure 13:
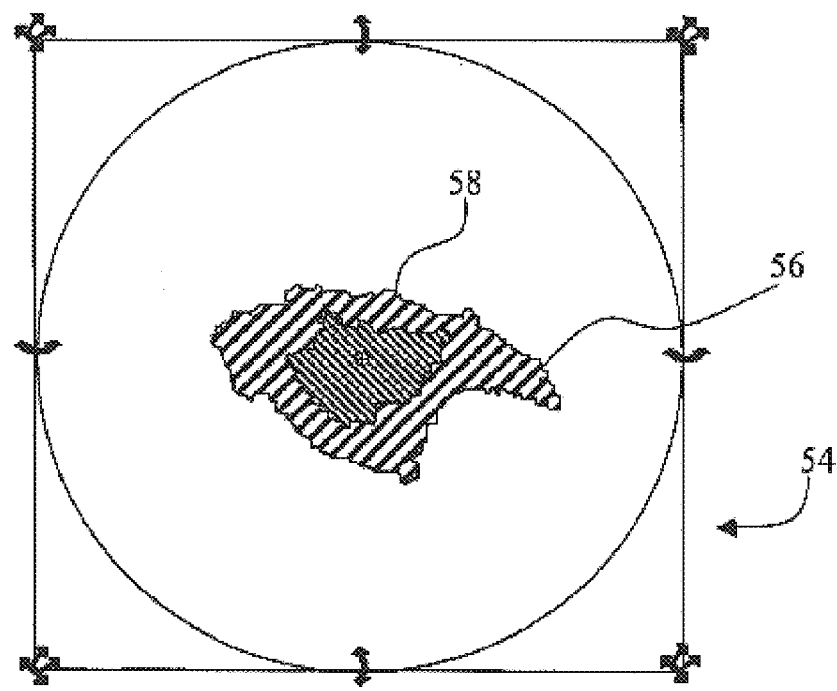
FIG. 13 illustrates a nodule containing a solid portion and a non-solid portion.

FIG. 12 illustrates two objects 50 connected together by a thin tissue tendril 52. A watershed algorithm produced the image illustrated in FIG. 12 by taking the gradient of the volume with a seed value to determine 3D contours described by intensity discontinuity of the volumetric data preserving thin connections such as tendril 52. FIG. 13 illustrates a nodule 54 containing a non-solid portion 56 (volume of which is denoted Va) and a solid portion 58 (volume of which is denoted Vb). Accordingly, nodule is classified as a part-solid nodule because nodule 54 consists of 2 or more tissue components (1 of which is solid (58)) that can each be segmented (either separately or simultaneously) as seen in FIG. 13.

It should be noted that a nodule can contain more than two distinct regions. In an exemplary embodiment, the 2 or more tissue components are, characterized by a specific range of CT attenuation values (HU) and is implemented in existing segmentation algorithms by a modification that includes an estimation and an appropriate tuning of watershed thresholds to support HU ranges for solid and non-solid regions of the nodule. Additionally, the volume contained in each of the tissue components (A and B (or others)) is determined independently and are represented by Va and Vb (or others in the case of more than two distinct regions).

Segmentation of tissue regions may be illustrated simultaneously on the graphical display supporting this design in 2-dimensional or 3-dimensional views at any orientation (axial, volume redering, etc.). Segmentation may be illustrated as any of the following: multiple lines of boundary, multiple shaded areas, multiple colored area, any combination of the above, and any unmentioned graphical methods for identifying regions within a 2 or 3-dimensional image. In one embodiment, the classified regions are color coded (solid is one color, part-solid is another color, and non-solid is a another color) and a color coded image is overlaid on a standard grayscale anatomical image.

The relationship between the volumes of the individual tissue components is important in determining the clinical state (i.e. malignancy or lack thereof) of the entire nodule (the spatial union of all of the tissue components). This relationship between tissue component volumes may be (but is not limited to) the ratios of such volumes. (E.G. Vb/(Va+Vb) or VbNa or other possible algebraic or non-algebraic combinations of these terms). Additionally, rather than color coding the regions themselves, areas with different ratios are displayed in different colors.

With respect to non-solid nodules, it is believed the herein described classification scheme properly applies to nodules of classification non-solid because they are composed of only one tissue type (i.e., a unique range of HU) as long as the watershed thresholds are not specific to a specific implementation, but rather are estimated from the image attributes (e.g. via histogram analysis of HU contained in bounding volume).

While the invention has been described in terms of various specific embodiments, those skilled in the art will recognize that the invention can be practiced with modification within the spirit and scope of the claims.

What is claimed is:

1. A method for detection and classification of nodules (N) in a tomographic image of an anatomical zone of a patient, said method comprising:
   segmenting the image to identify therein a region of interest including at least one nodule; and
   classifying regions of the nodule as one of solid, part-solid, and non-solid.

2. A method in accordance with claim 1 wherein said classifying includes classifying regions of the nodule as one of solid, part-solid, and non-solid using a watershed algorithm.

3. A method in accordance with claim 1 wherein said classifying includes classifying regions of the nodule as one of solid, part-solid, and non-solid based on Hounsfield units (HU) using a watershed algorithm.

4. A method in accordance with claim 1 further comprising color coding the classified regions based upon the classifications.

5. A method in accordance with claim 4 further comprising overlaying a color coded image of the regions on a grayscale anatomical image of the nodule.

6. A method in accordance with claim 1 further comprising calculating a ratio of a plurality of regions of different classifications.

7. A method in accordance with claim 1 wherein said classifying includes classifying regions of the nodule as one of solid, part-solid, and non-solid using a classification algorithm.

8. A method in accordance with claim 1 wherein said classifying includes classifying regions of the nodule as one of solid, part-solid, and non-solid based on Hounsfield units (HU) using a classification algorithm.

9. A computer configured to:
   segment an image to identify therein a region of interest including at least one nodule; and classify regions of the nodule as one of solid, part-solid, and non-solid.

10. A computer in accordance with claim 9 further configured to classify regions of the nodule as one of solid, part-solid, and non-solid using a watershed algorithm.

11. A computer in accordance with claim 9 further configured to classify regions of the nodule as one of solid, part-solid, and non-solid based on Hounsfield units (HU) using a watershed algorithm.

12. A computer in accordance with claim 9 further configured to color code the classified regions based upon the classifications.

13. An computer in accordance with claim 12 further configured to overlay a color coded image of the regions on a grayscale anatomical image of the nodule.

14. A computer in accordance with claim 9 further configured to calculate a ratio of a plurality of regions of different classifications.

15. A computer in accordance with claim 9 further configured to classify regions of the nodule as one of solid, part-solid, and non-solid using a classification algorithm.

16. A computer in accordance with claim 9 further configured to classify regions of the nodule as one of solid, part-solid, and non-solid based on Hounsfield units (HU) using a classification algorithm.

17. An imaging system comprising:
   at least one radiation source;
   at least one radiation detector; and
   a computer operationally coupled to said at least one radiation source and said at least one radiation detector, said computer configured to:
   segment an image to identify therein a region of interest including at least one nodule; and
   classify regions of the nodule as one of solid, part-solid, and non-solid.

18. An imaging system in accordance with claim 17 wherein said computer further configured to classify regions of the nodule as one of solid, part-solid, and non-solid using a watershed algorithm.

19. A An imaging system in accordance with claim 17 wherein said computer further configured to classify regions of the nodule as one of solid, part-solid, and non-solid based on Hounsfield units (HU) using a watershed algorithm.

20. A An imaging system in accordance with claim 17 wherein said computer further configured to color code the classified regions based upon the classifications.

21. An imaging system in accordance with claim 17 wherein said computer further configured to display a color coded image of the regions overlaid on a grayscale anatomical image of the nodule.

22. An imaging system in accordance with claim 17 wherein said computer further configured to classify regions of the nodule as one of solid, part-solid, and non-solid using a classification algorithm.

23. An imaging system in accordance with claim 17 wherein said computer further configured to classify regions of the nodule as one of solid, part-solid, and non-solid based on Hounsfield units (HU) using a classification algorithm.

24. A computer readable medium encoded with a program configured to instruct a computer to:
segment an image to identify therein a region of interest including at least one nodule; and
classify regions of the nodule as one of solid, part-solid, and non-solid.

25. A computer readable medium in accordance with claim 24 wherein said program further configured to instruct the computer to classify regions of the nodule as one of solid, part-solid, and non-solid based on Hounsfield units (HU) using a watershed algorithm.

26. A computer readable medium in accordance with claim 24 wherein said program further configured to instruct the computer to display a color coded image of the regions overlaid on a grayscale anatomical image of the nodule.

27. A computer readable medium in accordance with claim 24 wherein said program further configured to instruct the computer to classify regions of the nodule as one of solid, part-solid, and non-solid based on Hounsfield units (HU) using a classification algorithm.

* * * * *